(12) United States Patent
Maichl et al.

(10) Patent No.: US 10,767,779 B2
(45) Date of Patent: Sep. 8, 2020

(54) VALVE CONTROLLER AND METHOD FOR OPERATING A VALVE CONTROLLER

(71) Applicant: Festo SE & Co. KG, Esslingen (DE)

(72) Inventors: Martin Maichl, Salach (DE); Michael Berner, Kirchheim (DE)

(73) Assignee: FESTO SE & Co. KG, Esslingen (DE)

( * ) Notice: Subject to any disclaimer, the term of this patent is extended or adjusted under 35 U.S.C. 154(b) by 0 days.

(21) Appl. No.: 15/760,302

(22) PCT Filed: Sep. 15, 2015

(86) PCT No.: PCT/EP2015/071070
§ 371 (c)(1),
(2) Date: Mar. 15, 2018

(87) PCT Pub. No.: WO2017/045701
PCT Pub. Date: Mar. 23, 2017

(65) Prior Publication Data
US 2019/0049032 A1    Feb. 14, 2019

(51) Int. Cl.
*F16K 31/02* (2006.01)
*F15B 13/08* (2006.01)
*F15B 19/00* (2006.01)

(52) U.S. Cl.
CPC ............ *F16K 31/02* (2013.01); *F15B 13/085* (2013.01); *F15B 13/086* (2013.01); *F15B 13/0867* (2013.01); *F15B 19/005* (2013.01); *F15B 13/0857* (2013.01); *F15B 13/0864* (2013.01)

(58) Field of Classification Search
CPC ...... F16K 31/02; F15B 13/085; F15B 13/086; F15B 13/0867; F15B 19/005; G05D 16/2013

USPC ...................................................... 137/487.5
See application file for complete search history.

(56) References Cited

U.S. PATENT DOCUMENTS

| 4,380,416 A | 4/1983 | Menager |
| 4,399,836 A * | 8/1983 | de Versterre ........ F15B 13/0405 |
| | | 137/487.5 |
| 4,957,273 A * | 9/1990 | Sears ...................... F16K 31/02 |
| | | 251/129.04 |

(Continued)

FOREIGN PATENT DOCUMENTS

| DE | 102011016895 | * 10/2012 |
| EP | 1365159 | * 11/2003 |
| WO | WO2015074674 | 5/2015 |

*Primary Examiner* — Minh Q Le
(74) *Attorney, Agent, or Firm* — Hoffmann & Baron, LLP

(57) ABSTRACT

A valve controller for electrically actuating at least one valve drive, with a control circuit, which is designed to influence an electric energy flow between an electric source and the valve drive and which includes a bus interface for communication with a superordinate control arrangement (2) as well as a sensor means, which is designed to determine physical variable of the energy flow changeable by electrically actuating the valve drive as well as for providing a sensor signal dependent upon the determined physical variable to the control circuit wherein the control circuit is designed to determine a status value for the valve drive based on the sensor signal and at least one characteristic value of a physical variable from the group: energy flow duration, energy flow voltage, energy flow current, fluid pressure and is designed to provide the status value to the bus interface.

15 Claims, 4 Drawing Sheets

(56) References Cited

U.S. PATENT DOCUMENTS

| | | | | |
|---|---|---|---|---|
| 5,062,446 A * | 11/1991 | Anderson | G05D 7/0635 | 137/468 |
| 5,272,647 A * | 12/1993 | Hayes | F16K 37/0083 | 700/282 |
| 5,431,182 A * | 7/1995 | Brown | G05B 6/05 | 137/487.5 |
| 5,455,911 A * | 10/1995 | Johansson | G06F 13/423 | 700/1 |
| 6,011,741 A * | 1/2000 | Wallace | G06F 3/0601 | 365/221 |
| 6,272,401 B1 * | 8/2001 | Boger | F15B 5/006 | 700/282 |
| 6,343,794 B1 | 2/2002 | Brown | | |
| 6,466,893 B1 * | 10/2002 | Latwesen | G05B 23/0229 | 702/179 |
| 7,677,035 B2 * | 3/2010 | Plougsgaard | F15B 11/006 | 60/403 |
| 9,528,617 B2 * | 12/2016 | Maichl | F15B 13/0803 | |
| 2005/0241697 A1 * | 11/2005 | Ohmi | F16K 47/02 | 137/487.5 |
| 2006/0265105 A1 * | 11/2006 | Hughes | G05D 16/2013 | 700/282 |
| 2007/0183901 A1 * | 8/2007 | Chester | F15B 5/006 | 417/26 |
| 2010/0102974 A1 * | 4/2010 | Keast | F15B 19/005 | 340/626 |
| 2013/0092854 A1 * | 4/2013 | Okuda | G05B 19/0423 | 251/129.01 |
| 2014/0231683 A1 * | 8/2014 | Broker | F16K 31/02 | 251/129.01 |
| 2015/0192931 A1 * | 7/2015 | Grumstrup | G05D 16/2066 | 137/12 |
| 2015/0369380 A1 * | 12/2015 | De Carolis | F16K 11/00 | 137/625 |
| 2015/0378370 A1 * | 12/2015 | Maichl | F15B 13/0857 | 137/487.5 |
| 2016/0202224 A1 * | 7/2016 | Lloyd | G01N 33/0016 | 73/865.8 |
| 2017/0307102 A1 * | 10/2017 | Schmidt | F16K 31/02 | |

* cited by examiner

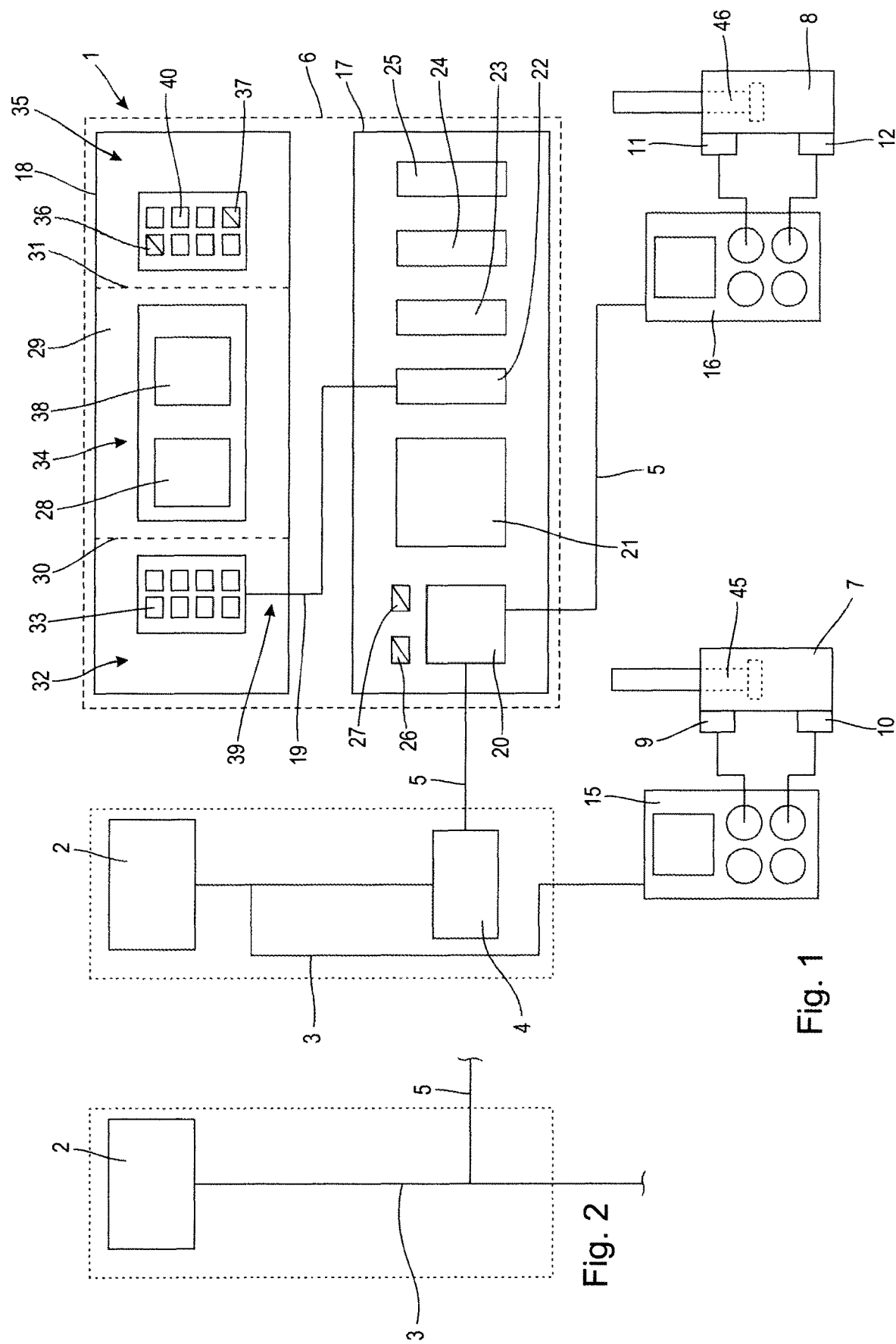

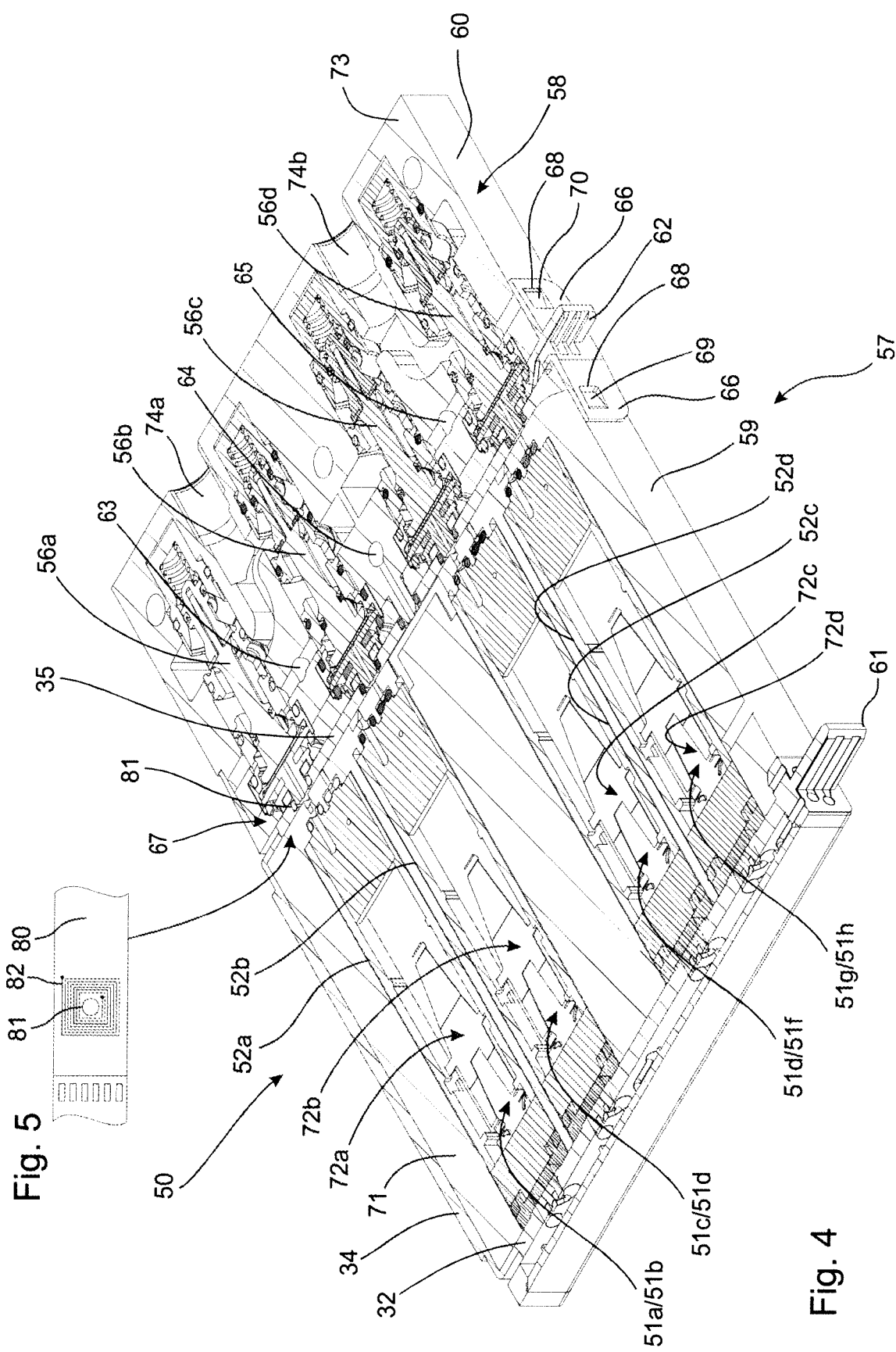

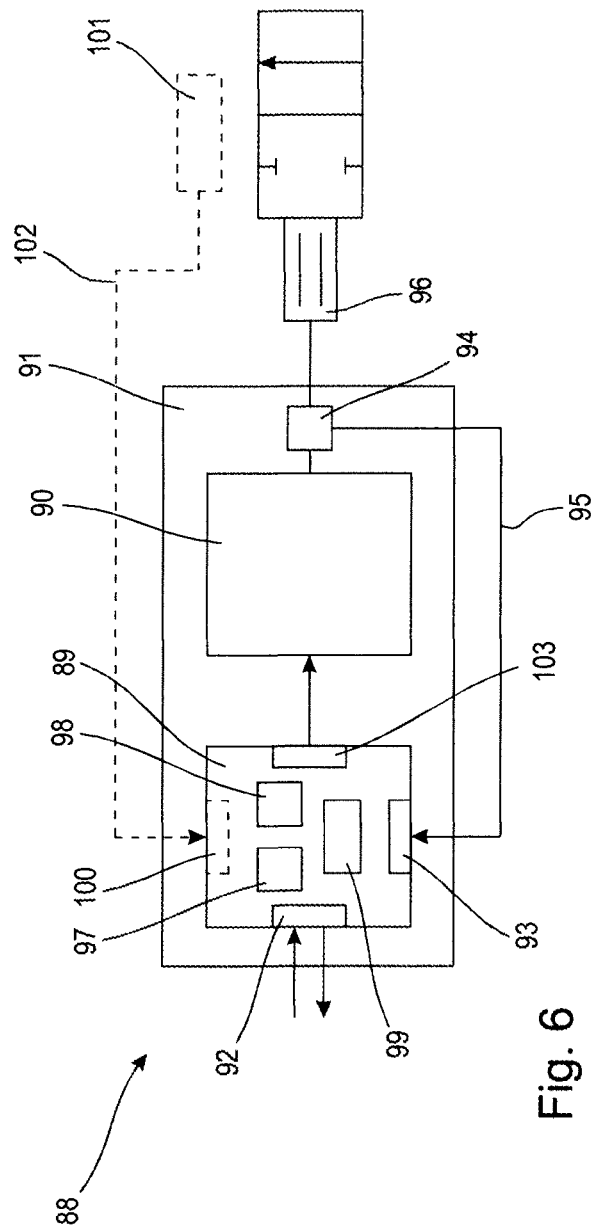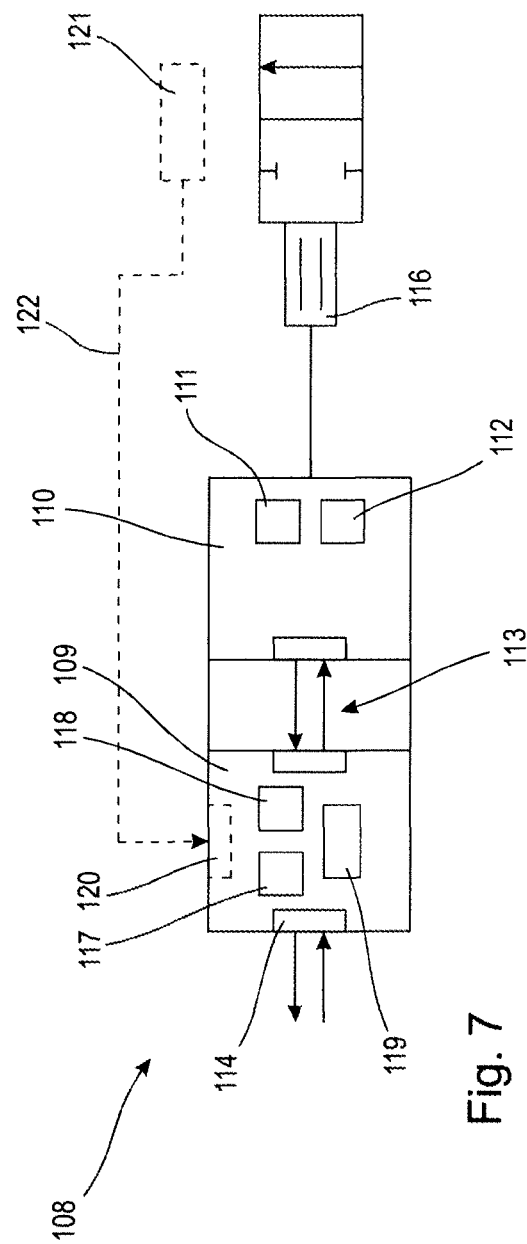

VALVE CONTROLLER AND METHOD FOR OPERATING A VALVE CONTROLLER

This application claims priority based on an International Application filed under the Patent Cooperation Treaty, PCT/EP2015/071070, filed Sep. 15, 2015.

BACKGROUND OF THE INVENTION

The invention relates to a valve controller for electrically actuating at least one valve drive, with a control circuit, which is designed to influence an electric energy flow between an electric source and the valve drive and which comprises a bus interface to communicate with a superordinate control arrangement and further comprises a sensor means, which is designed to determine a physical variable changeable by electrically actuating the valve drive and which is designed for providing a sensor signal dependent upon the determined physical variable to the control circuit. The invention further relates to a method for operating a valve controller.

A valve arrangement is known from PCT/EP2013/003524 for influencing at least one fluid current which has a control device and at least one valve device, wherein the control device has a bus interface for a connection with a bus communication system to receive movement commands, a processing device for processing the movement commands into control commands for valve devices and at least one connection device for electrically coupling valve devices and wherein the at least one valve device is electrically connected to one of the connection devices of the control device and has a processing means, which is designed to process the control commands, wherein a first connection means for electrically coupling valves and at least one second connection means for electrically coupling sensor means are assigned to the processing means.

SUMMARY OF THE INVENTION

The object of the invention is to provide a valve controller and a method for operating a valve controller, which have improved availability.

This object is achieved for a valve controller for electrically actuating at least one valve drive, with a control circuit, which is designed to influence an electric energy flow between an electric source and the valve drive and which comprises a bus interface to communicate with a superordinate control arrangement and further comprises a sensor means, which is designed to determine a physical variable changeable by electrically actuating the valve drive and which is designed for providing a sensor signal dependent upon the determined physical variable to the control circuit, wherein the control circuit is designed for determining a status value for the valve drive based on the sensor signal and based on at least one characteristic value of a physical variable is from the group: energy flow duration, energy flow voltage, energy flow current, fluid pressure, fluid volume current and is designed to provide the status value to the bus interface.

The valve drive, which is provided for actuation by the valve controller, is preferably a piezoelectric drive or a magnetic drive. In both cases, the object of the valve controller is to provide electric charges from a source to the valve drive and, if necessary, depending on the configuration of the valve drive, in particular as a piezo drive, to discharge electric charges provided to said drive and stored there. The provision of electric charges is preferably carried out as a function of a movement signal, which is generated either in the valve controller or is provided to the valve controller externally, in particular by a superordinate control device and is designated as an energy flow. For further consideration of the valve controller, it is assumed that the valve drive is designed either directly as a valve body, as may in particular be the case with a piezoelectric drive, or it is movement-coupled with a valve body in order to bring about a positive change for the valve body in any case as a function of the energy flow provided due to the movement signal. Through this positional change, the valve body can influence a free cross-section in a valve housing, in particular between a closing position and an opening position and thus adjust a fluid current from an electric source to a fluid consumer. The fluid consumer may optionally be a valve body of a main valve such that in this case the valve drive is designed as a component of a pilot valve, alternatively the fluid consumer is an actuator such as for example a fluid cylinder, in particular a pneumatic cylinder.

With the aid of the status value, which is determined by the control device, a statement is possible regarding a closure status of the valve drive and/or of the valve that is movement-coupled to the valve drive, from which information can be derived such as an operational life that is still to be expected for the valve drive or the valve. With the status value, which may be dimensioned (one or a plurality of SI units) or dimensionless, a precautionary replacement of the valve drive or valve should be carried out or at least prepared before the point of failure of the valve drive or the valve occurs. The desired improvement of the (time) availability of the fluidic system formed of the valve controller and the assigned valve is hereby achieved. The status value can be directly displayed on the output device of the valve controller, for example an optical display such as a control light or an alphanumeric display. The status value is preferably provided via the bus interface to a superordinate control device, in particular when a predefined threshold value is exceeded, said control device is usually equipped with an output device such as a display or monitor. Additionally or alternatively, the status value is provided wirelessly, in particular via an optical or electromagnetic transfer means to a portable user end device, such as a mobile phone or a portable computer.

It is particularly preferred in the valve controller according to the invention for the status value to be determined based on physical variables, which are in direct connection with the operation of the valve drive.

Based on an exclusive evaluation of sensors, in particular displacement measuring devices or limit switches, which are arranged on a fluidically-operable actuator, which is actuated with the aid of the valve provided with the valve drive and the assigned valve controller, statements regarding the number of switch cycles for the valve drive and, if necessary, regarding an ageing status of the valve could also at least be made. However, only indirect statements can be made based on this regarding the actual wear on the valve drive or valve, while by determining the status value, direct statements are possible regarding the use and ageing or the wear of the valve drive.

This in particular relates back to the fact that in order to determine the status value, in addition to the signal of the sensor means, at least one additional physical variable, such as the energy flow duration and/or the energy flow voltage and/or the energy flow current and/or a fluid pressure is incorporated at a valve input connection or a valve output connection in order to thereby allow direct statements to be made regarding the electromechanical use of the valve drive.

It is particularly advantageous for the sensor means to also determine a physical variable and convert it into a sensor signal which is in direct connection with the activation of the valve drive. For example, the sensor means for determining at least one additional physical variable from the group: energy flow duration and/or energy flow voltage and/or energy flow current and/or fluid pressure and/or fluid volume current or a stroke of the valve drive and/or a movement speed of the valve drive and/or an acceleration of the valve drive, is designed such that the status value is determined from at least two physical variables of the aforementioned group. For example, the status value can be determined from a combination of energy flow duration and energy flow current or a combination of energy flow duration and energy flow voltage or from a combination of energy flow duration and fluid pressure or other at least pairwise combinations of physical variables.

In this case, the energy flow duration is, in particular a cumulative time span within which an electric charge flow takes place from an electric source to the valve drive or from the valve drive to the electric source. The energy flow voltage is in particular the electric voltage by means of which the electric charge flow is provided to the valve drive. For example, in one configuration of the valve drive as a piezo actuator, in particular with constant energy flow current, a voltage difference between a charge start and a charge end can be considered for the piezo actuator. The energy flow current is the electric current, which flows between electric source and valve drive, wherein in the case of a configuration of the valve drive as a piezoelectric drive, a current direction is also considered since it is either a charging operation or a discharging operation for the piezo actuator. In one configuration of the valve drive as a piezo actuator, it can also still be considered over what time duration electric voltage was applied to the piezo actuator since a refined assessment of a wear status of the valve drive is thereby enabled. By considering the fluid pressure, in particular at a valve input connection or a valve output connection, a conclusion can be drawn on a static and/or dynamic loading of the valve drive which can also be incorporated when determining the status value. In this case, a pressure level of the fluid pressure is in particular of interest which possibly affects the valve drive in the long term or permanently or against which the valve drive must hold the valve body in a valve position predefined by the movement command.

For example, two differently designed sensor means are assigned to the control device which are designed to determine a characteristic value of a physical variable. Alternatively, only one sensor means is used for actually measuring a physical variable, while the at least one characteristic value of at least one physical variable is derived from a control signal which results from the movement signal that is processed in the valve controller. It is for example not necessary to measure the energy flow duration since it can be predefined by the control device, in particular taking into consideration an internal system clock of the control device and does not have to be determined by a separate sensor device. Similarly, possibly upon acceptance of a greater error, a characteristic value can be provided for the energy flow voltage and/or the energy flow current, in particular knowing the switching design of the control device and of the valve drive, based on a control signal alone.

Advantageous further developments of the invention are the subject matter of the dependent claims.

It is expedient for the control circuit to be designed to determine the status value for assessing a time course of the sensor signal and/or a time course of the at least one characteristic value, in particular for determining an extreme value or a gradient. To this end, the control circuit has a computing unit in which the sensor signal and/or the characteristic value are recorded, preferably at regular time intervals, in particular based on an internal system clock and a comparison with previous levels of the sensor signal and/or the characteristic value is carried out in order to allow a maximum and/or minimum level of the sensor signal and/or the characteristic value to be determined and/or a maximum and/or minimum gradient of the sensor signal and/or the characteristic value to be determined. The control circuit further has a memory device in which previous levels of the sensor signal and/or the characteristic value and/or extreme values and/or gradients can be stored in order to be able to draw conclusions therefrom regarding the status of the valve drive. For example, one or a plurality of characteristic values are stored in the memory device, which have been determined in a new status of the valve drive and which can later be used as a basis for a comparison with current characteristic values.

In a further configuration of the invention, the control circuit, in addition to the bus interface, has a sensor interface for a direct connection of the sensor means and an electric output stage for direct actuation of the valve drive.

The sensor interface can be designed as an analogue interface such that a sensor means can be connected which exclusively provides an analogue signal. Such a sensor means can for example be a limit switch (position transmitter) or a resistive displacement measuring system. Between the sensor means and the control circuit there is preferably only exactly one communication type and there is no conversion of the sensor signal. No analogue/digital conversion takes place in particular along a transfer path between sensor means and control circuit, in fact the control circuit is either designed to directly process the analogue signal provided or for an analogue/digital conversion of the analogue signal provided.

Insofar as the sensor means is designed for a digital transfer of the sensor signal, no additional conversion of the sensor signal takes place between the sensor means and the control circuit, in particular in the sense of a digital/analogue conversion or a digital/digital conversion. In fact, the sensor interface is designed in this case as a digital interface, which is designed for direct coupling of the digital sensor signal. Accordingly, the sensor interface is adapted to the digital communication protocol of the sensor means.

Coupling of undesired, external interferences and/or time delays in the transfer of the sensor signal from the sensor means to the sensor interface are minimised by this direct coupling of the sensor means to the control circuit.

The object of the electric output stage is to convert an actuation signal provided by the control circuit into an intermittent release of energy flow between the source and the valve drive. The electric output stage is preferably an electronic switch, in particular a field effect transistor (FET). The electric output stage is preferably arranged in a direct surrounding to the control circuit, in particular on the same circuit board as the control circuit. A transfer of the actuation signal can be hereby reliably designed without complex protective measures, without external inferences playing a significant part. The electric output stage is particularly preferably implemented as a component of an integrated circuit which also comprises the control circuit. This integrated circuit is preferably implemented as an ASIC (application specific integrated circuit) on a single silicon component such that the control circuit and the output stage(s)

are adapted exactly to the required application and have as few as possible, in particular no unnecessary or unnecessarily large dimensioned switch components.

An electric output stage with integrated sensor means for a direct actuation and status monitoring of the valve is preferably assigned to the control circuit. The electric output stage in particular in this case contains the sensor means. In this case, internal communication between control circuit and output stage is designed in a bidirectional manner in order to be able to transfer, on the one hand, the actuation signals from the control circuit to the output stage and, on the other hand, the sensor signals from the output stage to the control circuit. it is advantageous for the electric output stage to be implemented as a component of an integrated circuit, which also comprises the control circuit, in particular as an ASIC.

It is advantageous for the electric output stage to be designed as a high-voltage driver stage for an actuation of a piezo actuator. A highly-integrated control circuit can hereby be implemented with status monitoring for the connected piezo actuators.

In this case, it is particularly advantageous for the electric output stage(s) to be designed together with the control circuit as a single-piece, integrated circuit.

It is expedient for the control circuit, upon determining the status value, to be configured to incorporate a communication signal provided to the bus interface, in particular a position signal of a position sensor, which is designed to determine a position of an actuator. The bus interface can be provided as a bus interface for a preferably digital, in particular bidirectional communication of the control circuit with external components. These external components may be a superordinate control device and/or other bus participants, in particular control circuits, and/or position sensors. If necessary, the control circuit is electrically connected to the bus interface via an internal communication platform and a communication protocol is used for the internal communication between control circuit and bus interface, said communication protocol differing from a communication protocol with which external components communicate with the bus interface. For example, the control circuit is connected to the bus interface via a SPI interface (serial peripheral interface). The control circuit is in this case preferably designed as a slave and the bus interface as a master. The bus interface is particularly preferably designed as a processing device for processing external bus signals, which can be provided via a bus in particular by a superordinate control device as well as for processing internal bus signals, for example according to the SPI communication protocol. For example, the processing device analyses incoming external bus signals for the presence of movement commands and converts them into control commands, which are provided to the control circuit via the internal communication protocol, where they are subsequently converted into movement signals for the valve drives.

The sensor means is preferably designed to determine a position of the valve drive or to determine a position of a main valve, which is fluidically coupled to a pilot valve formed by the valve drive. In one configuration of the sensor means for determining a position of the valve drive, the sensor means determines an electric variable such as for example an electric voltage or an electric current, which are provided to the valve drive or the sensor means determines a movement or deformation of the valve drive based on an electromechanical measurement principle. In one configuration of the sensor means for determining a position of a pilot valve or main control valve that is movement-coupled to the valve drive, an electromechanical (electric resistance track, potentiometer) or an electromagnetic (Hall sensor) measurement principle is preferably applied in which a movement of a valve body of the pilot valve or main valve is converted into an electric measurement signal. Similarly, this applies for a configuration of the sensor means for determining a position of a main valve, which is fluidically coupled to a pilot valve actuatable by the valve drive. In this case, a fluidic transfer path is practically interconnected between the pilot valve and the main control valve, which thus flows into the sensor signal of the sensor means and accordingly is also a component of the monitoring function by the control circuit.

In a further configuration of the invention, the control circuit has a memory circuit in which in particular status values and/or sensor signals and/or characteristic values provided with time stamps are stored and the control circuit is designed to compare current status values and/or sensor signals and/or characteristic values with stored status values and/or sensor signals and/or characteristic values. Determined status values and/or sensor signals and/or characteristic values are preferably provided with a time stamp for subsequent processing in the control circuit, wherein this time stamp can be linked for example to an internal system clock of the control circuit such that a clear time allocation of stored values is possible. The time stamp allows a statement regarding when the respective characteristic value was determined in order to allow an as precise as possible calculation of the status value based on the time difference with more current or current characteristic values.

The object of the invention is achieved with a method providing the following steps: intermittent release of an electric energy flow between an electric source and a valve drive by a control circuit as a function of a movement signal, determining a physical variable of the energy flow between source and valve drive with the aid of a sensor means and providing a sensor signal dependent upon the determined physical variable to the control circuit, determining a status value for the valve drive based on the sensor signal and at least one characteristic value of a physical variable from the group: energy flow duration, energy flow voltage, energy flow current, fluid pressure (fluid input pressure, fluid output pressure) in the control circuit and providing the status value to a bus interface assigned to the control circuit.

In a further modification of the method, an evaluation of a time course of the sensor signal and/or a time course of the at least one characteristic value, in particular determining an extreme value or a gradient, is carried out in the control circuit to determine the status value.

In a further modification of the method, the control circuit for determining the status value performs a query of signal inputs at a bus interface, which is designed for communication with a superordinate control device, and at a sensor interface, which is designed for a direct connection of the sensor means.

In a further modification of the method, the control circuit, upon determining the status value, takes into consideration a position signal of a position sensor provided to the bus interface, said position sensor is designed to determine a position of an actuator.

In a further modification of the method, a determination of a position of the valve drive or a determination of a position of a main valve, which is fluidically coupled to a pilot valve formed by the valve drive, is performed with the sensor means.

In a further modification of the method, the control circuit performs a comparison of status values and/or sensor signals and/or characteristic values, in particular provided with time stamps, with current status values and/or sensor signals and/or characteristic values and provides a diagnostic signal to the bus interface in the presence of a predefinable deviation.

BRIEF DESCRIPTION OF THE DRAWINGS

An advantageous embodiment of the invention is illustrated in the drawing, wherein: It shows:

FIG. 1 a schematic representation of a fluidic system with a superordinate control device, a superordinate bus communication system and a subordinate bus communication system and a valve arrangement, which comprises a control device and a valve device, as well as a plurality of actuators and assigned sensors, FIG. 2 a cut-out representation of FIG. 1 with an alternative coupling of the valve arrangement to the superordinate bus communication system, FIG. 3 a schematic representation of a valve arrangement, which comprises eight piezo valves actuatable independently of each other and four main valves pneumatically actuatable by the piezo valves, FIG. 4 a perspective representation of a specific embodiment of the valve arrangement represented in FIG. 3, FIG. 5 a flat, schematic representation of a sensor means from FIG. 4, FIG. 6 a schematic functional representation of a second embodiment of a valve arrangement, and FIG. 7 a flat, schematic functional representation of a third embodiment of a valve device.

DETAILED DESCRIPTION OF THE PREFERRED EMBODIMENTS

Figure 3:
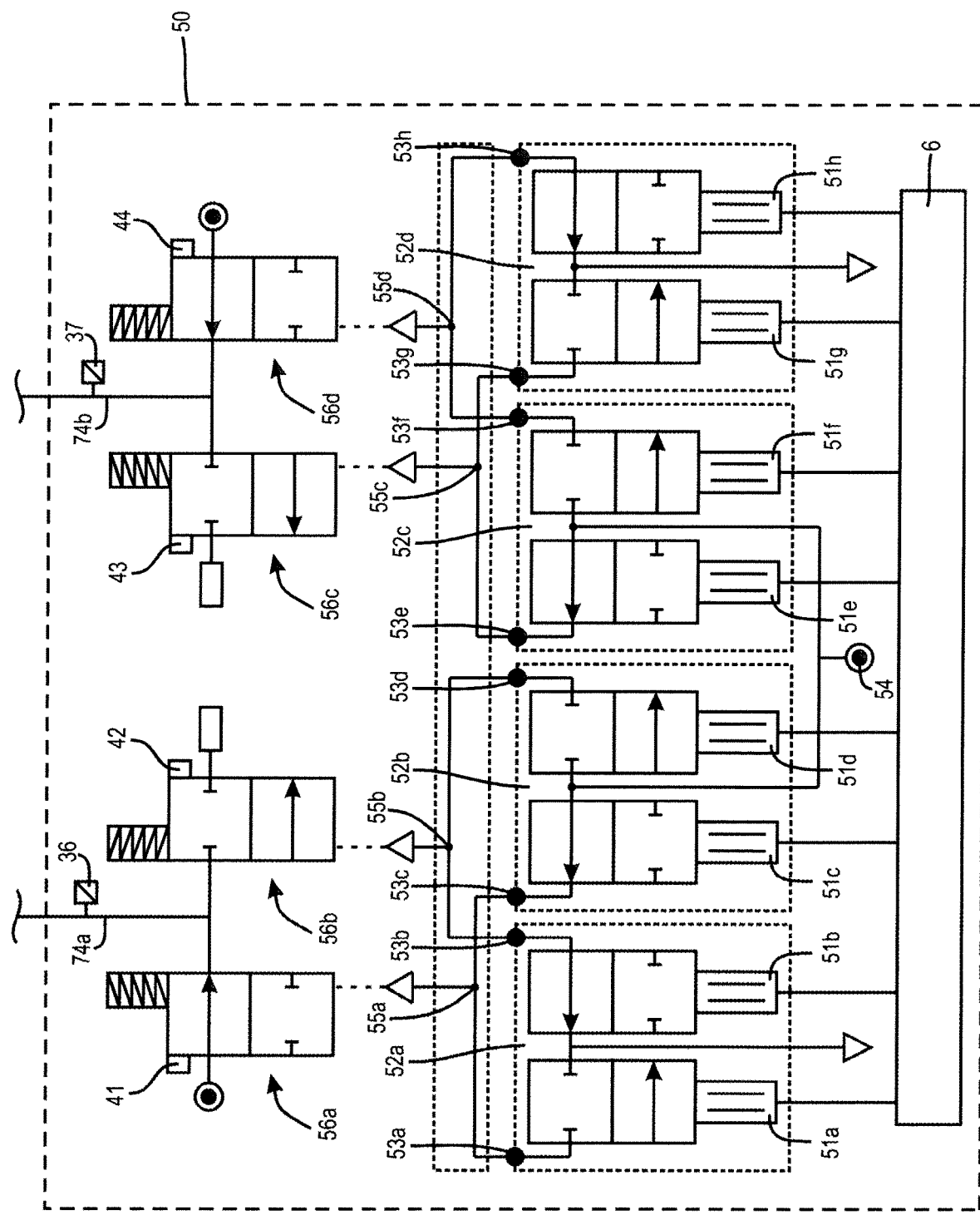

A fluidic system 1 schematically represented in FIG. 1 comprises a superordinate control device 2, a superordinate bus communication system 3, a bus coupler 4, a subordinate bus communication system 5, a valve arrangement 6 and a plurality of actuators 7, 8, external sensor devices 9 to 12 assigned to the actuators 7, 8 and input/output modules 15, 16.

A fluidic system 1 of this type can for example be used in a complex processing machine for automation purposes, not represented in greater detail, for example to intermittently stretch or transport workpieces, not represented, with the aid of actuators 7, 8. In order to coordinate the individual processes in a processing machine of this type, a superordinate control device 2 designed for example as a memory-programmable control (MCU) is provided which is connected to a superordinate bus communication system 3 in order to communicate with a plurality of bus participants. The bus participants are for example a motor controller, not represented, for actuating electric drive motors, also not represented, or bus couplers 4, which are designed for incorporation into the fluidic system 1 of complexly structured sub-components, such as for example the valve arrangement 6. Complex sub-components of this type can operate with a separate internal bus communication protocol independent of the bus communication protocol of the superordinate bus communication system 3 in order to address a plurality of bus participants within the subordinate bus communication system 5. While the superordinate bus communication system 3 is typically a field bus system according to one of the conventional field bus standards, the subordinate bus communication system 5 is typically a proprietary bus communication protocol individually customised to the requirements of the bus participants of the subordinate bus communication system 5.

Only a single bus participant designed as valve arrangement 6 is, in the present case, connected to the subordinate bus communication system 5 for the sake of graphical clarity, the structure and functioning of which is explained in greater detail below. The valve arrangement 6 comprises a control device 17 as well as a valve controller designated as valve device 18. For example, the control device 17 and the valve device 18 are designed structurally separate from one another and are included in housings that are not represented in greater detail. In this case, the control device 17 serves to actuate a plurality of valve devices 18, of which however only one is represented for the sake of clarity. A communication connection is provided between the control device 17 and the valve device 18, which is implemented for example by means of a connection cable 19. The communication connection can, for example, be designed as a digital, serial data communication, in particular according to the SPI standard (serial peripheral interface) for bidirectional communication between the control device 17 and the valve device 18.

The control device 17 is designed as an electronic circuit and has a plurality of electronic components, which are arranged on a printed circuit or circuit board. The electronic components described below in greater detail have essential significance for the functional scope of the control device 17, further electronic and electric components not described in greater detail below serve as peripheries and for example ensure the electric supply and the internal and external electronic communication of the electronic components described below. For example, the control device 17 comprises an electronic communication component 20 as a bus interface, which is provided to receive, process and transfer data, which are provided via the subordinate bus communication system 5. To this end, the communication component 20 is for example connected both to the bus coupler 4 and to the input/output module 16, which is designed for a connection to the subordinate bus communication system 5. The electronic communication component 20 can examine data arriving via the subordinate bus communication system 5 to determine whether these data are possibly intended for the control device 17. The electronic communication component 20 can also send data to the subordinate bus communication system 5 in order to transfer for example status notifications to the control device 2 regarding the function of the control device 17 and components connected thereto. The electronic communication component 20 can also transfer data to other participants of the subordinate bus communication system 5, which are provided to influence, in particular control or parametrise these additional bus communication participants. Provided the communication component 20 can infer information directed at the control device 17 from data, which arrive via the subordinate bus communication system 5, said communication component can transfer this information to a processing device 21.

For example, the processing device 21 is designed as a computing unit, in particular in the form of a microcontroller or microprocessor and comprises a memory device, not represented in further detail. The object of the processing device 21 is to process data which are provided, on the one hand, by the electronic communication component 20 and, which are, on the other hand, provided by connection devices 22-25 and valve devices 18 connected thereto. An essential object of the processing device 21 is to isolate movement commands from the data transferred via the subordinate bus communication system 5 and provided by the communication component 20, which describe a specific movement of an actuator 8 which is supposed to be actuated by the valve device 18. When a movement command of this type arrives, the processing device 21 initially determines the present status of the actuator 8. This takes place for example by sensor signals from external sensor devices and from sensor means, which are assigned to the valve device 18, being processed in the processing device 21.

Based on this determination of the current state of the connected actuator 8, the processing device 21 can create a movement profile for the connected actuator 8 in a subsequent work step, said movement profile subsequently being provided to the at least one valve device 18. The movement profile is for example a concrete specification for a temporal movement process of the connected actuator 8, which is converted in the valve device 18 into control signals to release the corresponding fluid currents, which are supposed to be released by the individual valves connected to the valve device 18 and be made available to the actuator 8. At least one control algorithm is preferably stored in the memory device of the processing device 21 not represented, with whose help a control of the actuator 8, in particular a position control, can be carried out. In this case, the at least one stored control algorithm can preferably be parametrised in order to adapt it to the properties of the connected actuator 8. For this purpose, the processing device 21 can be activated via the subordinate bus communication system 5 with the aid of the electronic communication component 20 and the bus coupler 4 via a suitable input device which is connected to the bus coupler 4. The input device is for example personal computer, in particular a laptop. It is particularly advantageous for the bus coupler 4 and/or the processing device 21 to comprise a web browser, which, according to a predefined protocol, provides an operator panel for the connected input device, in particular in the form of an input screen for the parameters in question.

The control device 17 also comprises at least one pressure sensor, in particular a supply pressure sensor 26 and an environmental pressure sensor 27. The supply pressure sensor 26 is connected to a fluidic supply line in a manner not represented in further detail, which is provided to provide fluid currents to the valves not represented, which are connected to the valve device 18. The environmental pressure sensor 27 has the object of determining an environmental pressure in the environment of the control device 17. For example, the supply pressure sensor 26 and the environmental pressure sensor 27 are designed as absolute pressure sensors such that a pressure measurement is carried out in the respective pressure sensor with respect to an internal vacuum. This is in particular advantageous when the valve device 18 is also fitted with absolute pressure sensors described below in further detail.

The valve device 18 also schematically represented in FIG. 1 comprises a processing means 28 designed as a computing unit, in particular a microcontroller or microprocessor, said processing means being arranged on a printed circuit 29. For example, the printed circuit 29 is produced as a circuit board with electric conductor paths, not represented in further detail, made of a flexible material composite and can thus be bent for example at the bending edges 30 and 31 by 90 degrees in order to ensure an advantageous integration into a valve module described in further detail below. The printed circuit 29 is divided into three regions 32, 34, 35 by the provided bending edges 30 and 31, wherein another division can also be selected or bending of the printed circuit 29 can be dispensed with. For example, a connection region is designed in the first region 32 of the printed circuit, which comprises a plurality of electrically-conducting connection contacts 33, which are provided for an electric connection with valves, not represented. In the second region, the processing means 28 is arranged with an electric and, if necessary, electronic periphery, not represented in further detail, wherein this periphery may in particular be electric and electronic components such as resistors, capacitors or integrated circuits. For example, an electric output stage arrangement 38 is also provided in the second region 34, which is electrically coupled to the processing means 28 and which can provide corresponding electric power to the respective connection contacts 33 when electric signals are applied by the processing means 28, in order to electrically actuate the valves connected thereto, not represented.

Two pressure sensors 36, 37 are arranged in the third region 35 of the printed circuit 29, which are preferably designed as absolute pressure sensors and are designed to determine a fluid pressure, in particular at a working output of a valve module. Electric connections 40 for position sensors, not represented in further detail, are also provided in the third region 35, by means of which for example the position of pneumatically-pilot operated main valves can be determined.

The processing means 28 are designed to communicate with the processing device 21 via a conducted, for example wired communication connection 39. The communication connection 39 is guided via the connection cable 19 to one of the connection devices 22-25 of the control device 17. The communication connection 39 is preferably carried out according to the SPI protocol bidirectionally between processing means 28 and processing device 21. In this case, the processing means 28 can, in particular receive control commands from the processing device 21 in order to convert them locally in-situ into control signals for the valves, not represented, connected to the connection contacts 33 by way of corresponding processing, in particular using stored or permanently programmed algorithms. The processing means 28 are also designed to process sensor signals, which are provided by the pressure sensors 36 and 37 as well as by the position sensors, not represented, which are connected to the electric connections 40. Pressure control for the valves based on the signals of the pressure sensors 36 and 37 and/or position control for the valves based on signals of the position sensors connected to the electric connections 40 can for example be hereby carried out by the processing means 28, which results in a corresponding actuation of the valves connected to the connection contacts 33 and which are not represented.

The sensor signals provided by the connected sensors, in particular the pressure sensors 36, 37 and the position sensors to the connections 40 can be provided as raw data or raw signals via the communication connection 39 to the processing device 21, in addition to the direct processing in the processing means 28. The processing device 21 is designed such that it can also apply control algorithms based on such raw data or raw signals, if necessary linking to sensor signals of external sensor devices 9, 10, which are provided via the subordinate bus communication system 5, in order to perform for example position control for one of the connected actuators 7 or 8. In this case, the positions sensors 9 to 12 are for example arranged both on the actuator 7 and on the actuator 8, which are provided for example to determine a position of a piston 45 or 46 of the actuators 7, 8 designed as pneumatic cylinders. In this case, the position sensors 9 and 10 are coupled to the superordinate bus communication system 3 via an external input/output module 15. Accordingly, the position signals of these position sensors 9 and 10 are transferred to the processing device 21 via the superordinate bus communication system 3, the bus coupler 4 and the subordinate bus communication system 5 as well as the communication component 20. The position sensors 11 and 12 are, however, connected to the internal input/output module 16, which communicates directly with the communication component 20 via the subordinate bus communication system 5, whereby a particularly short signal run time can be ensured between the sensors and the processing device 21.

In FIG. 2, an alternative means of connection is provided for the valve arrangement 6, in which a direct communication between the control device 2, the valve arrangement 6 and the input/output module 15 is provided. To this end, the electronic communication component 20 according to FIG. 1 is modified such that direct communication between the control device 2 and the valve arrangement 6 is enabled. This structuring is preferred when there is no variability required for the fluidic system with regard to the selection of the bus communication protocol, but rather the valve arrangements 6 are always connected to the same superordinate bus communication system 3.

An exemplary application for a valve arrangement 6 represented in FIG. 1 is represented in FIG. 3. The valve arrangement 6 is electrically connected to a valve slice 50 and provided to electrically actuate, for example, eight piezo valves 51a to 51h. The piezo valves 51a to 51h are respectively electrically connected to the connection contacts 33 of the valve arrangement 6 represented in FIG. 1 in a manner not represented in further detail and can thus be individually supplied with electric energy by the processing means 28. For example, in the embodiment according to FIG. 3, two of the piezo valves 51a to 51h are housed in a common receiving box 52a to 52d, wherein in each of the receiving boxes 52a to 52d, a predefinable pneumatic pressure level is present, which can be released by the piezo valves 51a to 51h housed in the corresponding receiving box 52a to 52d for provision to connection points 53a to 53h. In this case, the receiving boxes 52b and 52c are provided for application of supply pressure which is provided by a pneumatic source 54. The two receiving boxes 52a and 52d are, in contrast, connected in a communicative manner to the environmental pressure and serve to discharge pressurised fluid. A first connection point 53a is preferably pneumatically connected with a third connection point 53c and a second connection point 53b is preferably pneumatically connected to a fourth connection point 53d and respectively form a working connection 55a or 55b. A fifth connection point 53e is preferably pneumatically connected with a seventh connection point 53g and a sixth connection point 53f is preferably pneumatically connected to an eighth connection point 53h and respectively form a working connection 55c or 55d. A supply pressure or an environmental pressure can thus be applied at the working connections 55a to 55d.

The working connections 55a to 55d are for example connected to pneumatically pilot-controlled main valves 56a to 56d in order to optionally switch these main valves 56a to 56d designed for example as a 2-2-way valve between a first and a second switch position and to hereby enable an optional provision or discharge of pressurised fluid to or from a fluidic consumer, not represented, which can be connected to the output connections 74a, 74b.

For example, a pressure sensor 36 or 37 is assigned to each of the working connections 74a, 74b in order to be able to provide electric pressure signals to the processing means 28 of the valve device 18 via the pressure level applied at the working connections 74a, 74b. A position sensor 41 to 44 is also assigned to each of the main valves 56a to 56d, which is designed to determine a switch position of the respective main valve 56a to 56d. In another embodiment, not represented, the pneumatically pilot-controlled main valves can be designed in other switch configurations, in particular as 3-2-way-valves, as 5-2-way-valves or as proportional valves.

FIG. 4 shows a practical embodiment of the valve slice 50 represented in FIG. 3, whose mechanical and fluidic structuring is known from EP 2 549 125 A1, which is hereby fully incorporated, wherein for the overview, a summary of the essential elements of the known valve slice is carried out below. The reference numerals used in EP 2 549 125 A1 are hereby adapted to the reference numerals of the present figure description.

The valve slice 50 comprises a valve module 57 and a main valve module 58 which are both designed square-shaped for example. Contact means designed as flat plugs 61, 62 protrude at narrow sides 59, 60 of the valve slice 50, wherein the flat plug 61 is electrically assigned to the valve module 57 and the flat plug 62 is electrically assigned to the main valve module 58. The main valve module 58 is penetrated by a plurality of recesses 63, 64, 65 aligned normal to the cut plane of the representation according to FIG. 4, which, with a plurality of valve slices 50 arranged in a row, are designed as continuous channels for fluid supply and fluid discharge for the main valves 56a to 56d. Similarly, the valve module 57 is penetrated by recesses, which are provided for a fluidic supply and discharge of the piezo valves 51a to 51h and which are not discernible in FIG. 4.

The valve module 57 is connected to the main valve module 58 by elastic latching tabs 66, which are designed at a connection part 67 arranged between the valve module 57 and the main valve module 58. The latching tabs 66 comprise recesses 68, which are adapted to latching protrusions 69, 70 on the valve module 57 and the main valve module 58 and which are designed as a positive coupling with these latching protrusions 69, 70. The connection part 67 serves, in addition to the mechanical coupling of the main valve module 58 with the valve module 57, to electrically coupling the position sensors assigned to the main valve module 58, not schematically represented in further detail in FIG. 5, to the processing means 28 according to FIG. 3, not represented in further detail in FIG. 4. Additionally, signals of the position sensors can be provided to the flat plug 62. The third region 35 of the printed circuit 29 represented in FIG. 1 with the electric connections 40 is preferably arranged in the connection part 67 in order to ensure simple electric coupling of the position sensors to the processing means 28.

The first region 32 of the printed circuit 29 represented in FIG. 1 with the electrically-conductive connection contacts 33 for the electric supply of the piezo valves 51a to 51h is arranged on the narrow side of the valve module 57 facing the main valve module 58. The second region 34 of the printed circuit 29 extends between the first region 32 and the third region 35, whereby a compact integration of the printed circuit 29 into the valve module 57 is enabled. For example, the three regions 32, 34 and 35 of the printed circuit with flexible circuit sections, so-called "flex prints", are electrically and mechanically connected to one another. Using the flat plug 61, the valve arrangement can be connected to a bus coupler, not represented, for communication with a control device, also not represented.

The structuring of the valve module 57 and the main valve module 58 emerges in more detail from the sectional representation according to FIG. 4. For example, four valve cartridges 72a to 72d are received in receiving boxes 52a to 52*d* in a valve housing 71 of the valve module 57, wherein each of the valve cartridges 72*a* to 72*d* respectively comprises two piezo valves 51*a* to 51*h*.

For example, four main valves 56*a* to 56*d* are arranged in the main valve housing 73, which are designed for optionally providing a supply pressure or an environmental pressure at the output connections 74*a*, 74*b*.

A section 80 of the third region 35 of the printed circuit 29 designed as a circuit board is shown in a flat representation in the schematic representation of FIG. 5. This section 80 is penetrated by a borehole 81, which is designed for a fluidic connection between one of the valves of the valve module 57 and one of the valves of the main valve module 58 and which is also drawn into FIG. 4 for orientation purposes. A spiral conductor arrangement 82 is designed on one of the main surfaces of the section 80 represented in FIG. 5, said conductor arrangement is conductively connected to electronic components on the circuit board 29, not represented in further detail, and which is arranged at least substantially concentric to the borehole 81. The spiral conductor arrangement 82 serves as a detection coil to determine an axial position of the assigned main valve 56*a*, 56*b*, 56*c* or 56*d*. A sensor device using a detection coil is disclosed in PCT/EP2012/003051 which is made subject matter of this disclosure by express reference. A precise determination of the stroke position of the assigned main valve 56*a*, 56*b*, 56*c* or 56*d* can be carried out with such a spiral conductor arrangement 82 integrated into the circuit board 29 based on a cost-effective mode of manufacture.

In a variation of the spiral conductor arrangement, not represented in further detail the borehole is arranged in the edge region of the spiral conductor arrangement such that it is for example surrounded by only a few windings, in particular only by the last winding, of the spiral conductor arrangement, whereby a measurement characteristic advantageous for intended measurement purposes and differing from the concentric arrangement of the borehole in the spiral conductor arrangement can be achieved.

A second embodiment, represented in FIG. 6, of a valve controller designated as valve device 88, said valve controller can be integrated into the fluidic system 1 instead of the valve device 18, comprises a control circuit designated as processing means 89 as well as an output stage arrangement 90. For example, the processing means 89 and the output stage arrangement 90 are designed as discreet integrated circuits which are arranged on a common printed circuit 91 and electrically connected to one another.

In this case, the processing means 89 has a digital interface 92 for bidirectional communication, in particular according to the SPI bus protocol, with the processing device 21 represented in FIG. 1 via the connection cable 19.

The processing means 89 also comprises a sensor interface 93, which is designed for a connection of an external sensor means 94. Purely for example, the external sensor means 94 is designed as a current sensor, which is looped into a connection line 95 between the output stage arrangement 90 and a valve drive designed for example as a piezo valve 96. In this case, the electric sensor signal provided by the sensor means 94, in which it is in particular an analogue signal, is provided directly to the sensor interface 93. The sensor means 94 is preferably arranged on the same printed circuit 91 as the processing means 89 and the output stage arrangement 90.

The sensor signal is also further processed either in an analogue or digital manner in the processing means 89, wherein digital further processing is preferably provided. The processing means 89 also comprises a computing unit 97, a memory circuit 98 and a clock 99. The computing unit 97 is provided to process incoming sensor signals of the sensor means 94 and refers back to clock signals, provided by the clock 99, during this processing in order to enable for example an analysis of temporal processes of the sensor signals. The computing unit 97 is also designed to provide selected or all sensor signals and/or results of processed sensor signals with time stamps based on the clock signals of the clock 99 and to store them in the memory circuit 98.

Based on the currently incoming sensor signals as well as the clock signals of the clock 99 and, if necessary, taking into account stored sensor signals and/or results from processed sensor signals, the computing unit 97 can determine a status value by applying a permanently-programmed or freely predefinable algorithm, said status value reflecting a status of the valve drive connected in the form of a piezo valve 96. The determined status value can be stored in the memory circuit 98, preferably to provide the determined status value to the digital interface 92 so that said status value can be transferred to the processing device 21. In addition, the computing unit 97 is designed to convert movement signals arriving to the digital interface 92, which are also designated as movement profiles and can be provided by the processing unit 21, into control signals for the output stage arrangement 90, which are provided via a signal interface to the output stage arrangement 90, in particular in a unidirectional means of communication. Additionally or alternatively, the computing unit 97 can be designed to perform a provision of control signals to the output stage arrangement 90 based on permanently-programmed or freely predefinable movement programs.

Additionally and thus only indicated in dotted representation, the processing means 88 can be equipped with an additional interface 100. An external sensor means 101, for example a limit switch (position transmitter) can be connected to this additional interface 100 by means of a sensor line 102 for position determination of a main valve. A sensor signal provided by the external sensor means 101 can be taken into consideration when determining the status value in the processing means 89.

The valve device 108 represented in FIG. 7 is similarly designed as a valve controller like the valve device 88 and is distinguished from the valve device 88 in that the processing means 109 and the output stage arrangement 110 are built on a common silicon carrier as an integrated circuit. The valve device 108 can be integrated into the fluidic system 1 instead of the valve device 18. The output stage arrangement 110 comprises, unlike the output stage arrangement 90, an integrated current sensor 111 as well as an integrated voltage sensor 112, by means of which a voltage-current course can be determined directly in the output stage arrangement 110 for the valve drive 116 designed as a piezo valve and can be provided to the computing unit 117 of the processing means 109 via a bidirectional internal communication connection 113. The processing of the sensor signals of the current sensor 111 and of the voltage sensor 112 takes place there in the same manner as already described in connection with the processing device 88, preferably taking into account the clock signal of the clock 119 in order to determine the status value and in order to provide the status value to the digital interface 114. Additionally or alternatively, sensor signals also, in particular provided with time stamps and stored in the memory circuit 118 can be taken into account when determining the status value. A predefinable current (energy flow current) is preferably provided to the valve drive for a predefinable time period, which is also designated as the energy flow duration and the electric voltage (energy flow voltage) is preferably determined at the valve drive 116 prior to beginning and following ending of the time period in order to be able to calculate the status value.

Additionally and thus only indicated in dotted representation, the processing means 108 can be equipped with an additional interface 120. An external sensor means 121, for example a limit switch (position transmitter) can be connected to this additional interface 120 by means of a sensor line 122 for position determination of a main valve. A sensor signal provided by the external sensor means 121 can be taken into consideration when determining the status value in the processing means 109.

The output stage arrangements 90 and 110 are preferably designed as constant current sources and are in particular provided for the actuation of piezo actuators. Accordingly, the status value can be determined knowing the constant current, which is discharged by the respective output stage arrangement 90, 110, preferably by determining the energy flow duration, i.e. the period of time or periods of time determinable based on the clock signal, in which a charge transport is carried out from an electric source, not represented, to the valve drive or in the opposite direction. Additionally, the processing means 89, 109 can be designed to determine periods of time, in which one or a plurality of predefinable load thresholds caused by corresponding electric charging of the valve drive 96, 116 is exceeded in order to allow this information to flow into the calculation of the status value.

The invention claimed is:

1. A valve controller for electrically actuating at least one valve drive, with a control circuit, which is designed to influence an electric energy flow between an electric source and the valve drive, and which comprises a bus interface for communication with a superordinate control arrangement and further comprises a sensor means, which is designed to determine a physical variable changeable by electrically actuating the valve drive and designed for providing a sensor signal dependent upon the determined physical variable to the control circuit, wherein the control circuit is designed to determine a status value for the valve drive based on the sensor signal and based on at least one characteristic value of a physical variable from the group: energy flow duration, energy flow voltage, energy flow current, fluid pressure, fluid volume current and is designed to provide the status value to the bus interface, and
wherein the control circuit is designed to determine the status value by assessing an extreme value or a gradient of a time course of the sensor signal and/or by assessing an extreme value or a gradient of a time course of the at least one characteristic value.

2. The valve controller according to claim 1, wherein the control circuit, in addition to the bus interface, has a sensor interface for a direct connection of the sensor means and an electric output stage for direct actuation of the valve drive.

3. The valve controller according to claim 2, wherein the electric output stage is designed as a high-voltage driver stage for an actuation of a piezo actuator.

4. The valve controller according to claim 2, wherein the electric output stage together with the control circuit is designed as a single-piece, integrated circuit.

5. The valve controller according to claim 1, wherein an electric output stage with integrated sensor means for a direct actuation and status monitoring of the valve drive is assigned to the control circuit.

6. The valve controller according to claim 1, wherein the control circuit, upon determining the status value, is configured to incorporate a communication signal provided to the bus interface.

7. The valve controller according to claim 6, wherein the control circuit is configured to incorporate a position signal of a position sensor, which is designed to determine a position of an actuator.

8. The valve controller according to claim 1, wherein the sensor means is designed to determine a position of the valve drive or to determine a position of a main valve, which is fluidically coupled to a pilot valve formed by the valve drive.

9. The valve controller according to claim 1, wherein the control circuit comprises a memory circuit, in which status values and/or sensor signals and/or characteristic values are stored and wherein the control circuit is designed to compare current status values and/or sensor signals and/or characteristic values with stored status values and/or sensor signals and/or characteristic values.

10. The valve controller according to claim 9, wherein the memory circuit is designed to store the status values and/or the sensor signals and/or the characteristic values together with time stamps.

11. A method for operating a valve controller, which is supplied with an electric energy flow by a control circuit as a function of a predefinable movement signal, the method comprising:
intermittently releasing an electric energy flow between an electric source and a valve drive by a control circuit as a function of a movement signal;
determining a physical variable of the energy flow between source and valve drive with the aid of a sensor means;
providing a sensor signal dependent upon the determined physical variable to the control circuit;
determining a status value for the valve drive based on the sensor signal and at least one characteristic value of a physical variable from the group: energy flow duration, energy flow voltage, energy flow current, fluid pressure in the control circuit; and
providing the status value to a bus interface assigned to one of the control circuit,
wherein an evaluation of an extreme value or a gradient of a time course of the sensor signal and/or an evaluation of an extreme value or a gradient of a time course of the at least one characteristic value is carried out in the control circuit to determine the status value.

12. The method for operating a valve controller according to claim 11, wherein the control circuit, for determining the status value, performs a query of signal inputs at a bus interface, which is designed for communication with a superordinate control device, and at a sensor interface, which is designed for a direct connection of a sensor means.

13. The method for operating a valve controller according to claim 12, wherein the control circuit, upon determining the status value, takes into consideration a position signal of a position sensor provided to the bus interface, said position sensor is designed to determine a position of an actuator.

14. The method for operating a valve controller according to claim 11, wherein a determination of a position of the valve drive or a determination of a position of a main valve, which is fluidically coupled to a pilot valve formed by the valve drive is performed with the sensor means.

15. The method for operating a valve controller according to claim 11, wherein the control circuit performs a comparison of status values and/or sensor signals and/or characteristic values, with current status values and/or sensor signals and/or characteristic values and provides a diagnostic signal to the bus interface in the presence of a predefinable deviation.

* * * * *